Aug. 26, 1969 J. D. LOVELY 3,463,875

CIRCUIT FOR AUTOMATICALLY VARYING COLOUR TEMPERATURE BETWEEN MONOCHROME AND COLOUR RECEPTION IN A COMPATIBLE COLOUR TELEVISION RECEIVER

Filed July 17, 1967 2 Sheets-Sheet 1

INVENTOR
JOHN D. LOVELY

BY

Agent

Aug. 26, 1969 J. D. LOVELY 3,463,875

CIRCUIT FOR AUTOMATICALLY VARYING COLOUR TEMPERATURE BETWEEN MONOCHROME AND COLOUR RECEPTION IN A COMPATIBLE COLOUR TELEVISION RECEIVER

Filed July 17, 1967 2 Sheets-Sheet 2

INVENTOR
JOHN D. LOVELY

BY

Agent 3,463,875

CIRCUIT FOR AUTOMATICALLY VARYING COLOUR TEMPERATURE BETWEEN MONOCHROME AND COLOUR RECEPTION IN A COMPATIBLE COLOUR TELEVISION RECEIVER

John D. Lovely, Waterloo, Ontario, Canada, assignor to Electrohome Limited, Kitchener, Ontario, Canada Filed July 17, 1967, Ser. No. 653,970
Int. Cl. H04n 5/44
U.S. Cl. 178—5.4 10 Claims

ABSTRACT OF THE DISCLOSURE

The colour temperature of the image reproduced by the picture tube of a colour television receiver is automatically changed when the signal being received changes between a monochrome and a colour television signal by means of a radiation emitting device whose radiation emitting state varies for monochrome and colour reception and a radiation-sensitive electrical device that has an electrical characteristic that varies dependent upon the radiation emitting state of the radiation emitting device, and that is located in a position to receive radiation from the latter. The radiation-sensitive device is connected in circuit with at least one of the electron guns of the picture tube and automatically varies the grid-cathode potential difference of this gun and hence the beam current of this gun relative to the beam current of another gun in response to changes in the electrical characteristic of the radiation-sensitive electrical device.

Figure 1:
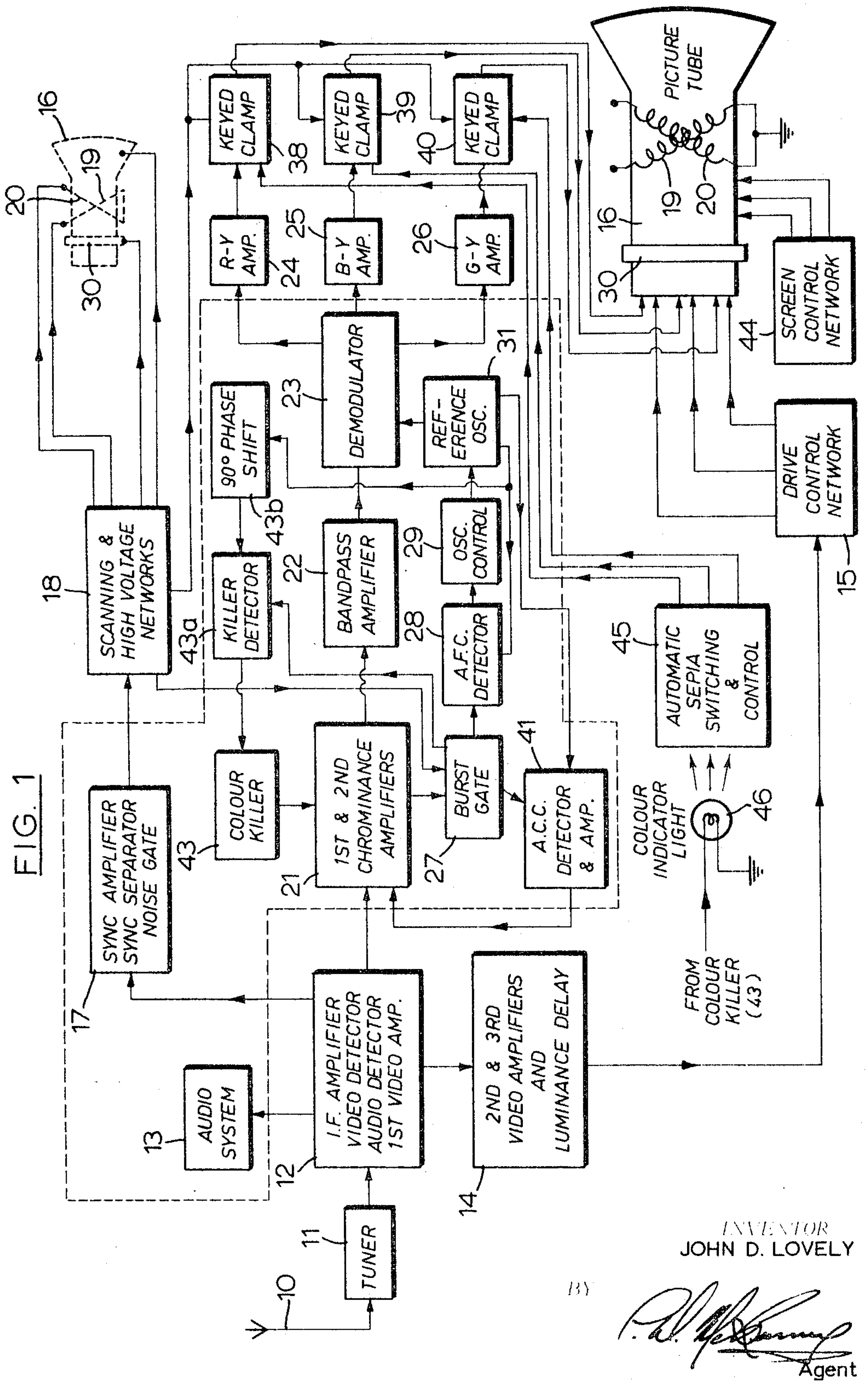

This invention relates to compatible colour television receivers. More particularly, this invention relates to temperature control networks for colour television receivers which operate to change colour temperature automatically depending upon whether a monochrome or a colour television signal is being received by the receiver.

It is well known that a reddish colour temperature of the order of, say, 8000° K. is necessary to enable a colour television receiver to reproduce flesh tones and other shades of brown satisfactorily during reception of a colour television signal. On the other hand, reddish or cool colour temperatures are not satisfactory during reception of a monochrome (black and white) television signal. In order to reproduce monochrome signals satisfactorily, warmer temperatures of the order of, say, 9350° K. are required.

In recognition of the foregoing, a number of networks or devices have been provided for automatically changing colour temperature depending upon the type of television signal being received by a colour television receiver.

Thus, for example, it is well known to vary colour temperature automatically by the use of a relay operated indirectly by the colour burst signal that always is present in a colour television signal. The primary objections to a colour television receiver that employs a relay for this purpose are the cost of the relay, the audible "click" associated with relay operation, and relay unreliability. With regard to the last factor, as is well known, relays are subject to malfunctioning due to mechanical failure or corrosion.

It also is known to provide a simple picture tube electron gun grid bias control that is not automatic in nature and which must be operated manually to redden the raster for colour reception and to make the raster blue-white for monochrome reception.

In the case of a hybrid colour television receiver, i.e., one which employs both vacuum tube networks and transistor networks, some of the latter being in the chrominance circuits of the receiver, automatic colour temperature control becomes, a problem, since the voltages at the electrodes of the picture tube are too high to permit direct connection between these electrodes and the low level transistor chrominance circuits.

In accordance with this invention, automatic colour temperature control is achieved by the use of a light dependent resistance or other radiation-sensitive electrical device, such as, for example, a photo transistor, in conjunction with the standard colour broadcast indicator lamp of a colour television receiver or some other suitable radiator that emits radiation during colour reception but not, or to a different extent, during black and white reception, or vice versa. A radiation-sensitive electrical device, as the term is used herein, is a device having an electrical characteristic, e.g. resistance, that varies with the magnitude, e.g., the presence and absence of incident radiation, e.g., light. A light dependent resistor is one having a resistance value that varies dependent upon the intensity of light incident thereon.

An automatic colour temperature control network embodying this invention is particularly useful in, although not limited in applicability to, a hybrid colour television receive, since it permits the high voltage picture tube electrodes of the receiver to be isolated from the low level transistor chrominance circuits of the receiver.

In brief, in accordance with a preferred embodiment of this invention, there is provided a receiver for reproducing monochrome and colour images of televised scenes of a type comprising a picture tube having "red," "green" and "blue" electron guns each including a cathode and grid electrode, and means for automatically changing the voltage differential between the cathode and grid electrodes of at least one of the electron guns when the signal being received by the receiver changes between a monochrome television signal and a colour television signal to automatically vary the colour temperature of the image reproduced by the picture tube by varying the beam current of one gun relative to the beam current of another. The last-mentioned means, in accordance with this invention, include a radiation emitting device, means for varying the radiation emitting state of the radiation emitting device dependent upon whether a monochrome or a colour television signal is being received by the receiver, a radiation-sensitive electrical device having an electrical characteristic that varies dependent upon the radiation emitting state of the radiation emitting device and located in a position to receive radiation from the latter, and means connecting the radiation-sensitive electrical device and at least one of the electron guns of the picture tube in a circuit to vary the grid-cathode potential difference of this electron gun in response to changes in the aforementioned electrical characteristic of the radiation-sensitive electrical device.

Figure 2:
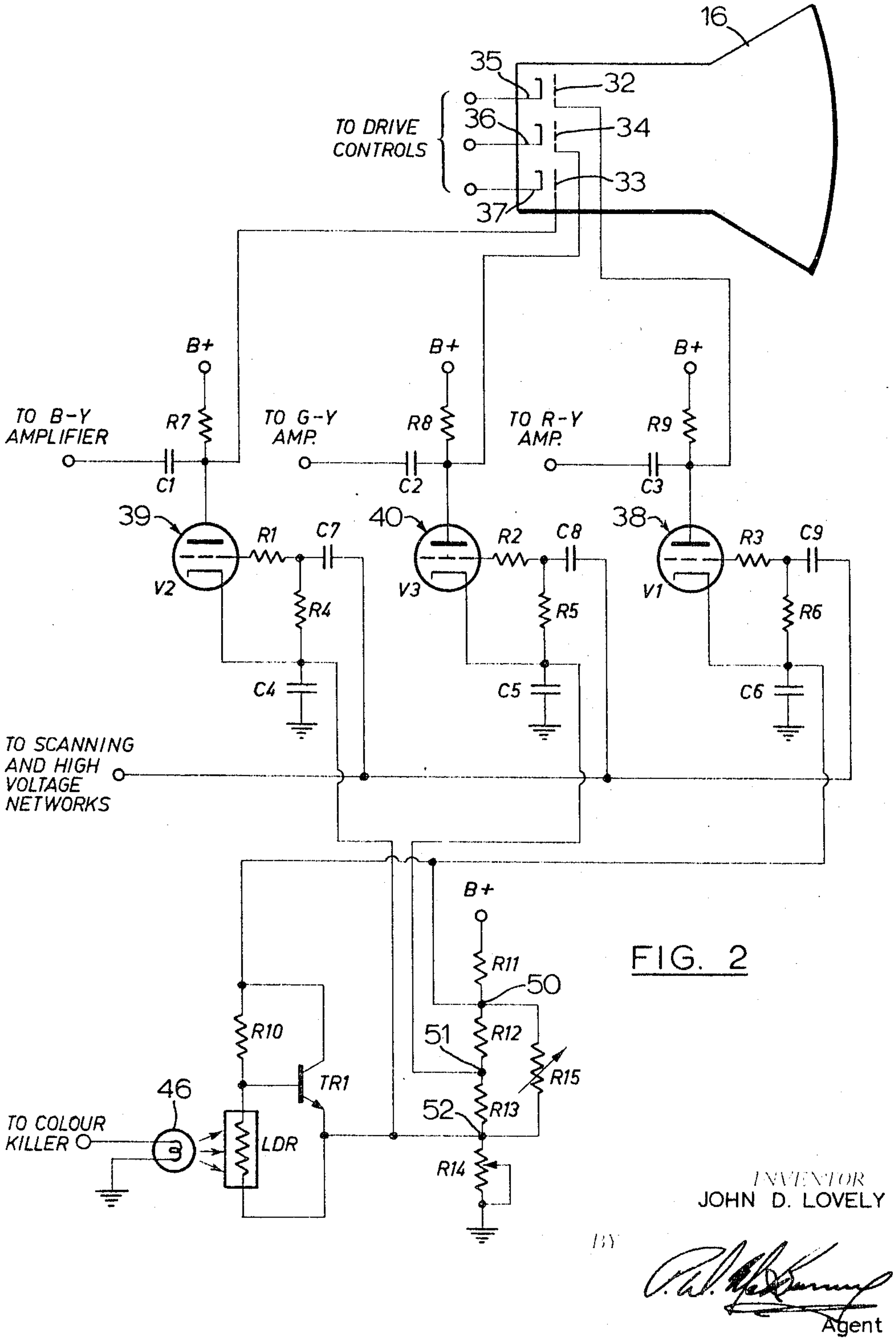

This invention will become more apparent from the following detailed description, taken in conjunction with the appended drawings, in which:

FIGURE 1 is a block diagram of one form of a conventional colour television receiver modified in accordance with this invention; and , FIGURE 2 is a circuit diagram illustrating one embodiment of this invention and constituting a part of the colour television receiver illustrated in FIGURE 1.

Those skilled in the art will appreciate that the colour television receiver shown in FIGURE 1 employs conventional components for the most part, so that only a brief description will be given herein of the receiver of FIGURE 1 and its mode of operation. With reference to FIGURE 1, an antenna 10 is connected to the input circuit of a tuner 11 that comprises one or more radio frequency (R.F.) amplification stages and a first detector. The signal to which the tuner is tuned is amplified by the R.F. amplifier or amplifiers and detected, the detected signal then being applied to a block designated 12 containing one or more intermediate frequency (I.F.) amplifiers, a video detector, an audio detector and a first video amplifier. The detected signal from tuner 11 is amplified by one or more I.F. amplifiers, the audio and video components of the signal detected, and the video signal amplifier by the first video amplifier.

The luminance component (Y) of the video signal is amplified by second and third video amplifiers 14 and then applied to the drive control network 15 for the conventional three gun picture tube 16 of the receiver. As shown, the drive control network has three output lines connected to the cathodes 35, 36, and 37 (FIGURE 2) of the "red," "green" and "blue" electron guns respectively of picture tube 16.

The detected audio signal is supplied to a block 13 designated audio system and comprising a limiter, a discriminator, an audio frequency (A.F.) amplifier of one or more stages and a loudspeaker, the audio signal thereby being reproduced in a well known manner.

Synchronizing (sync) information is derived by one of the detectors in block 12 and applied to a block 17 consisting of a sync amplifier, sync separator and noise gate. The sync signal output from block 17 is applied to a block 18 containing the scanning and high voltage networks of the receiver. More specifically, block 18 comprises a horizontal scanning signal generator consisting of a line frequency oscillator, a phase detector and a frequency control stage for providing automatic control of the oscillator frequency; a vertical scanning signal generator; a horizontal convergence network; and a vertical convergence network. A horizontal scanning signal is developed and applied to the primary winding of an output transformer (not shown) having its secondary winding connected to the horizontal scanning coil 20 of the deflection yoke (not shown) of the receiver. A vertical scanning signal is developed and is coupled to the vertical scanning coil 19 of the deflection yoke of the receiver. Vertical and horizontal convergence signals also are developed and applied to a deflection yoke assembly shown schematically at 30. One high voltage D.C. output line of the high voltage network of block 18 also is connected to picture tube 16.

An automatic gain control system may be included within block 17 to develop an A.G.C. potential for application to tuner 11 and one of the I.F. amplification stages in block 12, as is well known.

The chrominance component of the video signal is amplified by first and second chrominance amplifiers 21, and a part of the signal then is applied to a bandpass amplifier 22, another part of the signal being applied to a colour burst amplifier or gate 27. Keying pulses from block 18 are applied to colour burst amplifier 27, and its applies its output to an automatic frequency control (A.F.C.) detector 28, an automatic chroma control (A.C.C.) detector and amplifier network 41 and a killer detector **43*a*. A.F.C. detector 28 provides a control signal that is applied to an oscillator control device 29 that controls the frequency of a colour or reference oscillator 31. The output signal of oscillator 31 is applied to A.C.C. detector 41, A.F.C. detector 28 and a colour demodulator 23 and also to killer detector 43*a* via a 90° phase shift network 43*b*. The output signal of bandpass amplifier 22 also is applied to demodulator 23, which may comprise a pair of synchronous demodulators for developing a red colour difference signal (R–Y), a blue colour difference signal (B–Y) and a green colour difference signal (G–Y). These three signals are amplified by colour difference amplifiers 24, 25 and 26 respectively and applied to the control grids, 32, 33 and 34 respectively (FIGURE 2) of the three electron guns of picture tube 16. Keyed clamp networks 38, 39 and 40 each including a triode are employed to clamp the colour difference signals to the potentials of the cathodes of the triodes during the retrace time, thereby establishing the potentials of grids 32–34** and hence colour temperature, as will be explained in greater detail in connection with FIGURE 2.

The operating frequency and phase of oscillator 31 corresponds to that of the colour burst signal (3.58 mHz.), and the oscillator output signal and the signal from burst amplifier or gate 27 are compared in A.C.C. detector 41. A.C.C. detector 41 produces a signal indicative of reception of a colour signal and that varies in magnitude with the level of the received signal. This signal is supplied to the first chrominance amplifier in block 21 to vary the gain of this amplifier to compensate for variations in the level of the received signal. One output of colour killer 43 is applied to the second chrominance amplifier in block 21 and determines whether this amplifier is biased on or off.

The block 44 designates a conventional screen control network connected to the three screen electrodes of the three guns of colour picture tube 16.

In accordance with one embodiment of this invention, there is provided an automatic colour temperature control network 45 containing a radiation-sensitive electrical device, the latter being positioned to receive radiation from a radiation emitter device which, in the embodiment of the invention shown in FIGURE 1, is the conventional colour indicator lamp 46 of the receiver. This lamp is connected to colour killer 43 and is illuminated when a colour television signal is being received by the receiver, but not during monochrome reception. The three output leads of colour temperature control network 45 are connected to keyed clamps 38, 39 and 40 respectively and supply voltages to these keyed clamps that result in automatic changes in the grid-cathode potential difference of the electron guns of picture tube 16 in response to the signal being received by the receiver changing from monochrome to colour or from colour to monochrome.

In operation, during colour reception the signal to which tuner 11 is tuned is amplified and converted to an intermediate frequency signal by the R.F. amplifier and detector in block 11. The resulting I.F. signal is amplified in block 12 and the audio and video signals detected, the latter being amplified by the first video amplifier in block 12. The luminance component of the video signal is amplified by the second and third video amplifiers 14 and applied via drive control network 15 to the cathodes 35–37 of picture tube 16. The chrominance component of the video signal is amplified by the first and second chrominance amplifiers in block 21 and by bandpass amplifier 22, the output of which is applied to demodulator 23 that develops chrominance signal information for concurrent application to the three grid electrodes 32–34 of picture tube 16. The colour burst signal amplified by burst amplifier 27 is applied to A.F.C. detector 28 that synchronizes colour oscillator 31 via oscillator control device 29. The colour bust signal and the signal from oscillator 31 are compared by A.C.C. detector 41 which provides an output signal indicating both the presence and magnitude of the chrominance part of the received signal. As explained hereinbefore, A.C.C. detector 41 controls the gain of the first chrominance amplifier. One output signal from colour killer 43 is employed to control the gain of the second chrominance amplifier in block 21. In this respect, during reception of a colour signal, the second chrominance amplifier is permitted to operate by the colour killer, so that the chrominance signal channel is open. However, during monochrome reception when no colour burst signal is present, colour killer 43 will cause the second chrominance amplifier to be biased off, thereby preventing the passage of a signal to the electron guns of picture tube 16 over the chrominance signal channel. Whether a colour or monochrome signal is being received will be indicated by lamp 46 connected to colour killer 43 and which will be illuminated for colour reception but will be off during monochrome reception.

The audio signal detected by the audio detector of block 12 drives audio system 13 to enable the audio program accompanying the video signal to be reproduced.

Appropriate synchronized scanning signals are developed by the scanning network of block 18 and are applied to deflection coils 19 and 20 to deflect the electron beams of the three electron guns across the target electrode to develop an image raster. These beams are suitably modulated by luminance information from amplifiers 14 and, during colour reception, by chrominance information from colour difference amplifiers 24–26, so that traverse of these beams across the screen of picture tube 16 results in the reproduction of the televised image.

The instant invention is particularly applicable to a hybrid colour television receiver wherein some of the circuits of the receiver employ transistors, while others employ electron discharge devices. Thus, it may be assumed that the various circuits encompassed within the dotted lines shown in FIGURE 1 are transistor circuits, whereas the colour difference amplifiers 24–26 and the keyed clamps 38–40 are electron discharge device circuits. Of course, as pointed out hereinbefore, the instant invention is not restricted to a hybrid colour television receiver.

A preferred embodiment of the instant invention is shown in detail in FIGURE 2, to which reference now is made. Keyed clamps 38–40 include electron discharge devices in the form of triodes V1, V2 and V3 respectively, each having an anode, a cathode and a control grid electrode. The anodes of triodes V1–V3 each are connected to a source of D.C. potential ($B^+$) via load resistors R9, R7 and R8 respectively. Decoupling capacitors C4, C5 and C6 are connected between ground and the cathodes of triodes V2, V3 and V1 respectively. Colour difference signals from colour difference amplifiers 24, 25 and 26 are coupled via coupling capacitors C3, C1 and C2 respectively to grid electrodes 32, 33 and 34 respectively of the three electron guns of picture tube 16, one terminal of each of capacitors C1, C2 and C3 being connected to the anodes of electron discharge devices V2, V3 and V1 respectively.

A resistive network consisting of four resistors R11, R12, R13 and R14, the latter being variable, connected in series with each other in the order named is connected between a source of D.C. potential ($B^+$) and ground. Resistor R14 is a preset brightness control.

A variable resistor R15 for sepia control is connected in parallel with the series circuit consisting of resistors R12 and R13. The terminal 50 at the junction of resistors R11 and R12 is connected to the cathode of triode V1. The terminal 51 at the junction of resistors R12 and R13 is connected to the cathode of triode V3. The terminal 52 at the junction of resistors R13 and R14 is connected to the cathode of triode V2. Keying pulses from block 18 (FIGURE 1) are applied to the grid electrodes of triodes V1–V3 via capacitors C9, C7 and C8 respectively and resistors R3, R1 and R2 respectively. A resistor R6 is connected between the common terminal of capacitor C9 and resistor R3 and the cathode of triode V1. A resistor R5 is connected between common terminal of resistor R2 and capacitor C8 and the cathode of triode V3. A resistor R4 is connected between the common terminal of resistor R1 and capacitor C7 and the cathode of triode V2.

A variable resistance element in the form of a transistor TR1 having base, collector and emitter electrodes is provided. A bias resistor R10 is connected between the collector and base electrodes of transistor TR1, while a radiation-sensitive electrical device in the form of a light dependent resistor LDR is connected between the base and emitter electrodes of transistor TR1. Bias for transistor TR1 is supplied from $B^+$ via resistors R11 and R10. It will be noted that the emitter electrode of transistor TR1 is connected to terminal 52, while the collector electrode of transistor TR1 is connected to terminal 50. Consequently, a device having a variable resistance, namely transistor TR1 is connected in parallel with the series circuit consisting of resistors R12 and R13. Light dependent resistor LDR is so positioned with respect to colour indicator lamp 46 that light rays therefrom are incident upon the light dependent resistor when the lamp is illuminated.

The three keyed clamps 38–40 clamp the colour difference signals to the potentials of the cathodes of the three triodes V1, V2 and V3 respectively during the retrace time, thereby establishing the potentials of grid electrodes 32, 33 and 34 respectively, and thus the temperature of the picture reproduced by picture tube 16. To this end, capacitors C1–C3 should be sufficiently small that during the retrace interval, the voltage at the anodes of triodes V1–V3 just prior to the application of a keying pulse to the grid electrodes thereof can be re-established at the potentials of the cathodes of triodes V1–V3.

The correct temperature of the picture reproduced by picture tube 16 for monochrome reception is present by adjustment of drive controls 15 (FIGURE 1). During monochrome reception, lamp 46 will not be illuminated. Consequently, light dependent resistor LDR will have a high resistance, and transistor TR1 will be in saturation. Under these circumstances, the collector-emitter resistance of transistor TR1 will be very small, so resistors R12 and R13 will be essentially short-circuited, and the cathode of each triode V1–V3 will be at substantially the D.C. potential at terminal 51.

When a colour television signal is being received, the presence of the colour burst will deactivate colour killer 43, causing colour indicator lamp 46 to light. This, in turn, will reduce the resistance of light dependent resistor LDR, causing transistor TR1 to be cut off. Under these circumstances, the resistance between the collector and emitter electrodes of transistor TR1 will be appreciably higher than the resistance of resistors R12 and R13 in series, so that there will be a voltage drop across both resistors R12 and R13. Consequently, the D.C. potentials of the cathodes of triodes V1–V3 will change automatically, and this will be reflected in a change in the grid cathode potential difference of the three electron guns of picture tube 16. By a proper choice of resistors R11–R14, the precise colour temperature for a colour picture thus can be obtained automatically. In the circuit shown in FIGURE 2, the cathode potential of triode V3 will not change appreciably when the signal being received changes between colour and monochrome, but there will be an appreciable change in the cathode potentials of triodes V1 and V3. Solely by way of example, resistor R11 may be 100K, resistors R12 and R13 may be 47K each and resistor R14 may be 100K. During a colour reception, sepia may be controlled by varying resistor R15, which may be a 50K resistor.

It should be appreciated that the circuit of FIGURE 2 is merely one way of carrying out the instant invention, and numerous other embodiments are possible. Thus, while colour indicator lamp 46 turns on during colour reception but is off during monochrome reception, it would be possible to reverse this and have lamp 46 on for monochrome reception and off for colour reception. Naturally, this would require a modification of the automatic colour temperature control circuit of FIGURE 2 to ensure that the change in colour temperature was in the correct direction when the received signal changed from monochrome to colour and vice versa. Thus, in this case, light dependent resistor LDR could be connected in parallel with resistors R12 and R13 in series, eliminating transistor TR1. As mentioned previously, other radiation emitting devices could be substituted for lamp 46, and other radiation-sensitive electrical devices could be substituted for light dependent resistor LDR. Naturally, it is immaterial how the radiation emitting device is energized, as long as its radiation emitting state changes when the received signal changes from monochrome to colour and vice versa. This invention also is applicable to colour television receivers of the type wherein the colour difference signals are matrixed with the luminance signal at a point prior to the colour difference amplifiers. Under these circumstances, –R, –G and –B signals are applied to the three cathodes of the picture tube. In this case, terminals 50, 51 and 52 could be connected directly to grid electrodes 32, 34 and 33 respectively and keyed clamps 38–40 eliminated. It is not essential to vary the grid-cathode potential difference of all three electron guns of picture tube 16 in order to obtain automatic colour temperature control. Thus, it would be sufficient, for example, to merely decrease the grid-cathode potential difference of the "red" gun for colour reception or, alternatively, to increase the grid-cathode potential differences of the "blue" and "green" electron guns of picture tube 16 for colour reception. Various combinations of the foregoing are possible, of course. Thus, during colour reception there may be an automatic decrease in the grid-cathode potential difference of the "red" gun, as well as an automatic increase in the grid-cathode potential difference of the "blue" and/or "green" guns. Also, instead of adjusting the control grid-cathode potential difference for temperature control, the same results can be achieved by adjusting the screen grid-cathode potential difference. In all cases there is an automatic change in the intensity of the beam current of one gun relative to the intensity of the beam current of another gun when the signal being received changes between monochrome and colour. The invention may be employed with any picture tube having two or more guns.

While preferred embodiments of this invention have been disclosed herein, those skilled in the art will appreciate that changes and modifications may be made herein without departing from the spirit and scope of this invention as defined in the appended claims.

What I claim as my invention is:

1. In a receiver for reproducing monochrome and colour images of televised scenes of a type comprising a picture tube having at least two electron guns each including a cathode and grid electrode, and means for automatically changing the voltage differential between said cathode and grid electrodes of at least one of said electron guns and the intensity of the beam current of said one electron gun relative to the intensity of the beam current of another of said electron guns when the signal being received by said receiver changes between a monochrome television signal and a colour television signal, said last-mentioned means comprising a radiation emitting devices, means for varying the radiation emitting state of said radiation emitting device dependent upon whether a monochrome or a colour television signal is being received by said receiver, a radiation-sensitive electrical device having an electrical characteristic that varies dependent upon the radiation emitting state of said radiation emitting device and located in a position to receive radiation from said radiation emitting device, and means connecting said radiation-sensitive electrical device and at least one of said electron guns in a circuit to vary automatically the grid-cathode potential difference of said one electron gun in response to changes in said electrical characteristic.

2. The invention according to claim 1 wherein said radiation emitting device is a light emitting device and said radiation-sensitive electrical device is a light dependent resistor.

3. The invention according to claim 1 wherein said receiver has "red," "green" and "blue" electron guns and wherein said means connecting said radiation-sensitive electrical device and at least one of said electron guns consist of means connecting said radiation-sensitive electrical device and said "red," "green" and "blue" electron guns.

4. The invention according to claim 1 wherein said receiver has "red," "green" and "blue" electron guns and wherein said receiver includes first, second and third clamping networks including first, second and third electron discharge devices respectively having first, second and third anode, cathode and control grid electrodes respectively, means for applying keying pulses to said control grid electrodes of said electron discharge devices, means connecting said first, second and third anodes and said grid eletcrodes of said "red," "green" and "blue" electron guns respectively, a resistive network having a plurality of terminals, a source of D.C. potential connected to said resistive network and providing different D.C. voltages at said terminals, and means D.C. connecting said cathodes of said electron discharge devices and said terminals, said radiation-sensitive electrical device being connected in circuit with at least a part of said resistive network to automatically vary the resistance thereof and hence the D.C. voltage appearing at at least some of said terminals in response to changes in said electrical characteristic.

5. The invention according to claim 4 wherein said circuit in which said radiation-sensitive electrical device and said part of said resistive network are connected includes variable resistance means connected in parallel with at least said part of said resistive network, said radiation-sensitive electrical device being connected to vary the resistance of said variable resistance means in response to changes in said electrical characteristic.

6. The invention according to claim 5 wherein said variable resistance means is a transistor having collector, emitter and base electrodes, said radiation-sensitive electrical device being connected between said base and emitter electrodes, at least said part of said resistive network being connected between said emitter and collector electrodes.

7. The invention according to claim 6 wherein said resistive network includes first, second, third and fourth resistors connected in series with each other in the order named, said cathode of said first electron discharge device being connected to a terminal of said resistive network between said first and second resistors, said cathode of said second electron discharge device being connected to a terminal of said resistive network between said second and third resistors, said cathode of said third electron discharge device being connected to a terminal of said resistive network between said third and fourth resistors, said second and third resistors being connected between said emitter and collector electrodes.

8. The invention according to claim 7 including a variable resistor connected in parallel with said second and third resistors in series.

9. The invention according to claim 8 wherein said fourth resistor is a variable resistor.

10. The invention according to claim 6 wherein said radiation emitting device is a light emitting device and said radiation-sensitive electrical device is a light dependent resistor.

References Cited

UNITED STATES PATENTS 2,954,426 9/1960 Kroger ------------ 178—5.4

ROBERT L. GRIFFIN, Primary Examiner

R. L. RICHARDSON, Assistant Examiner